United States Patent
Lee et al.

(10) Patent No.: US 8,902,378 B2
(45) Date of Patent: Dec. 2, 2014

(54) LIQUID CRYSTAL DISPLAY DEVICE

(75) Inventors: Sang-Hyun Lee, Gyeonggi-Do (KR); Won-Taek Moon, Gyeonggi-Do (KR); Yong-Ik Hwang, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 241 days.

(21) Appl. No.: 12/833,147

(22) Filed: Jul. 9, 2010

(65) Prior Publication Data

US 2011/0007242 A1 Jan. 13, 2011

(30) Foreign Application Priority Data

Jul. 9, 2009 (KR) .......................... 10-2009-0062683

(51) Int. Cl.
*G02F 1/1335* (2006.01)
(52) U.S. Cl.
CPC .... *G02F 1/133608* (2013.01); *G02F 1/133615* (2013.01); *G02F 2001/133612* (2013.01)
USPC .................. 349/62; 349/61; 349/64; 349/65; 349/67; 349/68
(58) Field of Classification Search
USPC ...................................... 349/61–68
See application file for complete search history.

(56) References Cited

U.S. PATENT DOCUMENTS

| 5,499,120 | A | 3/1996 | Hansen |
| 7,292,290 | B2 * | 11/2007 | Miyagawa et al. ............. 349/58 |
| 7,359,012 | B2 * | 4/2008 | Ishiwa et al. .................... 349/65 |
| 7,557,451 | B2 * | 7/2009 | Shinojima ...................... 257/776 |
| 2005/0030443 | A1 * | 2/2005 | Nagahama ....................... 349/64 |
| 2005/0254258 | A1 | 11/2005 | Lee |

(Continued)

FOREIGN PATENT DOCUMENTS

| CN | 2743867 Y | 11/2005 |
| CN | 1866110 A | 11/2006 |

(Continued)

OTHER PUBLICATIONS

Chinese Office Action in corresponding Chinese patent application 201010226774.8 with English translation.

(Continued)

*Primary Examiner* — Hoan C Nguyen
(74) *Attorney, Agent, or Firm* — Morgan, Lewis & Bockius LLP

(57) ABSTRACT

In a liquid crystal display (LCD) device, an LED PCB with the reflection layer formed on surface thereof is installed at an upper side of the LED array and a reflection plate extends such that it sufficiently covers the lower portion of the LED array to thus make light emitted from the light source incident to its maximum level, thus coping with the reduction in the quantity of light resulting from making the LCD device thinner. The LCD device includes: a liquid crystal panel; an LED array supplying light to the liquid crystal panel; a light guide plate installed in a direction in which the LED outputs light, and guiding light; a reflection plate formed between the LED array and a lower portion of a lower cover; and an LED PCB attached to an upper portion of the lower cover at an upper side of the LED array and having a reflection layer formed at a side facing the light guide plate. Because an existing LED housing reflector is removed, a cost and processing time can be reduced and an assembling process is simplified to improve a defective rate and production yield.

10 Claims, 2 Drawing Sheets

(56) References Cited

U.S. PATENT DOCUMENTS

| | | | |
|---|---|---|---|
| 2006/0097364 A1* | 5/2006 | Shinojima | 257/666 |
| 2007/0058392 A1 | 3/2007 | Watanabe et al. | |
| 2007/0076140 A1 | 4/2007 | Mai | |
| 2008/0074902 A1 | 3/2008 | Oh | |
| 2009/0116262 A1 | 5/2009 | Park | |
| 2010/0164362 A1* | 7/2010 | Miyakawa et al. | 313/498 |
| 2010/0253872 A1* | 10/2010 | Park et al. | 349/58 |
| 2011/0205453 A1* | 8/2011 | Kasai | 348/790 |

FOREIGN PATENT DOCUMENTS

| | | |
|---|---|---|
| CN | 1971374 A | 5/2007 |
| DE | 69316010 T2 | 6/1998 |
| DE | 10 2005 033 982 A1 | 2/2007 |
| DE | 10 2006 060 758 A1 | 7/2008 |
| JP | 2007-080520 A | 3/2007 |
| JP | 2007-080544 A | 3/2007 |
| JP | 2007-127962 A | 5/2007 |
| JP | 2007127962 A | 5/2007 |
| KR | 10-2009-0046417 A | 5/2009 |
| TW | 285714 U | 9/1996 |
| TW | 092113174 | 5/2004 |
| TW | 200425803 A | 5/2004 |
| TW | 200825555 A | 6/2008 |

OTHER PUBLICATIONS

Office Action dated Jul. 26, 2013 from the Korean Intellectual Property Office in counterpart application No. 10-2009-0062683.

Office Action from the Korean Intellectual Property Office dated Jan. 31, 2013 in counterpart application No. 10-2009-0062683.

Office Action from the Taiwanese Intellectual Property Office dated Mar. 6, 2013 in counterpart application No. 099122776.

Office Action dated Aug. 27, 2013 from the Taiwan Intellectual Property Office in Taiwanese counterpart application No. 099112776.

Office Action dated Apr. 30, 2014, issued by the State Intellectual Property Office of China in Chinese Patent Application No. 201010226774.8.

German Office Action in corresponding German Application No. 10 2010 030 043.8 dated Dec. 7, 2011.

* cited by examiner

LIQUID CRYSTAL DISPLAY DEVICE

BACKGROUND OF THE INVENTION

1. Field of the Invention

The present invention relates to a liquid crystal display (LCD) device and, more particularly, an LCD device for supplying light to a liquid crystal panel by using a plurality of light emitting diodes (LEDs).

2. Description of the Related Art

In general, an LCD is a display device for displaying a desired image by adjusting a light transmittance of pixels by separately supplying data signals according to image information to the pixels arranged in a matrix form.

Accordingly, the LCD device includes a driving unit for driving the liquid crystal display panel with the pixels arranged in the matrix form thereon and the pixels.

The liquid crystal panel includes a thin film transistor (TFT) array substrate and a color filter substrate attached in a facing manner with a uniform cell gap maintained therebetween, and a liquid crystal layer formed in the cell gap between the array substrate and the color filter substrate.

In this case, a common electrode and pixel electrodes are formed on the liquid crystal display panel, which is formed as the array substrate and the color filter substrate are attached, to apply electric field to the liquid crystal layer.

Thus, in a state that voltage is applied to the common electrode, when the voltage of the data signal applied to the pixel electrode, liquid crystal of the liquid crystal layer is rotated due to dielectric anisotropy according to the electric field between the common electrode and the pixel electrodes, thus transmitting light or interrupting light by pixels to allow for display of characters or images.

In this case, the LCD device is a light receiving device that displays an image by adjusting the transmittance of light coming from an external light source, rather than emitting light by itself, so it requires a device, namely, a backlight, for supplying light to the liquid crystal panel.

The backlight is divided into a side type backlight in which lamps are disposed at one side or at both sides of the liquid crystal panel and light is reflected, diffused and concentrated through a light guide plate, a reflection plate and optical sheets so as to be transmitted to a front surface of the liquid crystal panel and a direct type backlight in which lamps are disposed on a rear surface of the liquid crystal panel so as to be directly transmitted to the front side of the liquid crystal panel.

FIG. 1 is a perspective view of a general side type backlight.

As shown in FIG. 1, the side type backlight includes a light guide plate 41 disposed on a rear surface of the liquid crystal panel (not shown), lamps 25 disposed at the side of the light guide plate 41, a reflection plate 42 disposed on a rear surface of the light guide plate 41, a lamp holder (not shown) for fixing the lamps 25 to the side of the light guide plate 41, and wirings 27 applying power to the lamps 25.

Light generated from the lamps 25 are made incident to the side of the light guide plate 41 made of a transparent material, and the reflection plate 42 disposed on the rear surface of the light guide plate 42 reflects light transmitted to the rear surface of the light guide plate 41 to an upper surface of the light guide plate 41, thus reducing a loss of light and improving uniformity.

In general, as the lamps 25 applied to the side type backlight or the direct type backlight, a tube type cold cathode fluorescence lamp (CCFL) having a length corresponding to a longer side distance or a shorter side distance of the liquid crystal panel is applied, and the CCFL generates white light by power supplied through the wirings 27 at both sides thereof.

In this case, when the CCFL is applied as a light source of the backlight, a fluorescent discharge tube encapsulating mercury (Hg) gas with argon (Ar), neon (Ne), or the like, added thereto is used as a fluorescent tube in order to use a penning effect. In this case, electrodes are formed at both ends of the fluorescence discharge tube, and a negative electrode is formed to be large in a plate form, and when voltage is applied thereto, charge particles within the discharge tube collides with the negative electrode in the plate shape, like a sputtering phenomenon, to generate secondary electrons, and the generated secondary electrons excite the nearby elements to form plasma. These elements emit strong ultraviolet rays, and as the emitted ultraviolet rays excite phosphor again, the phosphor emits visible rays.

However, the backlight using the CCFL has not good color reproduction because the light source, namely, the CCLF, does not have good light emission characteristics. In addition, the size and capacity of the fluorescent lamp are limited, a backlight of a high luminance cannot be obtained.

In addition, because mercury applied as phosphor to the CCFL is harmful to a human body, it cannot cope with the environment regulation which is gradually strengthened.

Recently, a light emitting diode (LED) receives much attention as a light source of the backlight. The LED has a longer life span than that of the CCFL, and because it operates at a DC of 5V, it does not need an inverter.

Namely, the high luminance LED has a longer life span than that of the CCFL and consumes power 20% of the existing product, and because the high luminance LED does not need additional equipment such as an inverter or the like, it is advantageous for making a product thinner and effectively use an inner area. Also, its color implementation capability is evaluated to be superior to the CCFL, and the full-fledged regulation since 2006 worldwide supports the adoption of the LED backlight.

FIG. 2 is a sectional view schematically showing a general LCD using an LED backlight.

As shown in FIG. 2, in the general side-type LED backlight LCD, an LED array 20 generating light, an LED printed circuit board (PCB) 21 for driving the LED and a reflective plate 42 are installed on a lower cover 50, and an LED housing reflector 55 is attached to an upper portion of the lower cover 50 at an upper side of the LED array 20.

A light guide plate 41 is installed in a direction in which the LED array 20 outputs light, and in this case, a plurality of LEDs constituting the LED array 20 are positioned between LEDs at a certain interval in order to obtain an overall luminance uniformity of the backlight.

The reflective plate 42 positioned under the light guide plate 41 serves to reflect light outputted from the LED array 20 toward the lower cover 50 to transmit it toward optical sheets 43. The LED housing reflector 55 reflects light outputted toward the upper portion of the lower cover 50 from the LED array 20 to transmit it toward the optical sheets 43.

A liquid crystal panel 10 composed of a TFT array substrate and a color filter substrate is mounted on an upper portion of the LED backlight thusly configured and coupled with an adhesive tape 11 through an upper case (not shown) to form the LCD.

Meanwhile, with the development of the display industry, demand for a thinner display and reduction in a production cost is increasing.

In order to make the existing LED backlight thinner, the thickness of respective main components must be minimized.

However, the performances such as the minimization of thickness, an optical efficiency and mechanic reliability are traded off each other, causing a limitation in minimizing the thickness.

In addition, in order to reduce the cost of the existing backlight, a processing time must be reduced, a production yield must be improved, and the cost of row materials must be cut down. However, there is a limitation in the shortening the processing time and improving the production yield, and the pressure of an increase in the cost of the raw materials is also increasing, making it difficult to cut down the costs.

Thus, with these problems, the related art fails to cope with the current demand for thinner display and cost cutdown.

Namely, in the general LCD illustrated in FIG. 2, if a thickness d1 of the LCD is reduced to meet the demand for making the display thinner, an assembly process, in particularly, an assembly processibility of the LED housing reflector 55, would deteriorate. Also, if the size of the LED array 20 is reduced, the quantity of light would be reduced, and also, because the LED PCB 21 and the reflective plate 42 overlaps, reflection efficiency is degraded.

SUMMARY OF THE INVENTION

Therefore, in order to address the above matters, the various features described herein have been conceived.

An aspect of the present invention provides a liquid crystal display (LCD) device having an LED backlight that does not cause a problem with respect to an environmental regulation of a cold cathode fluorescence lamp (CCFL).

Another aspect of the present invention provides an LCD device which is thinner and lighter, and has a reduced cost and processing time by omitting an LED housing reflector.

Another aspect of the present invention provides an LCD device capable of effectively coping with a reduction in the quantity of light resulting from a lighter and thinner configuration.

According to an aspect of the present invention, there is provided an LCD device including: a liquid crystal panel; an LED array supplying light to the liquid crystal panel; a light guide plate installed in a direction in which the LED outputs light, and guiding light; a reflection plate formed between the LED array and a lower portion of a lower cover; and an LED PCB attached to an upper portion of the lower cover at an upper side of the LED array and having a reflection layer formed at a side facing the light guide plate.

According to an aspect of the present invention, there is provided a method for fabricating an LCD device including: providing a liquid crystal panel; providing an LED array for generating light to the liquid crystal panel; providing a reflection plate between the LED array and a lower portion of the lower cover; providing a light guide plate in a direction in which the LED array outputs light; and attaching an LED PCB having a reflection layer to an upper portion of the lower cover at an upper side of the LED array, wherein the reflection layer is formed at a side facing the light guide plate.

As described above the LCD according to an exemplary embodiment of the present invention can properly cope with an environmental regulation that is gradually strengthened, because it does not cause such a problem with the environmental regulation as a CCFL.

In addition, because the LED PCB with the reflection layer formed on surface thereof is installed at an upper side of the LED array and the reflection plate extends such that it sufficiently covers the lower portion of the LED array to thus make light emitted from the light source incident to its maximum level, thus making the LCD device thinner, and accordingly, coping with the reduction in the quantity of light. For example, in the case of the LCD device according to an exemplary embodiment of the present invention, the problem as in the related art in which the reflection plate extends to overlap is basically avoided, so the reflection efficiency of the reflection plate can be increased by 5% or greater.

Also, because the LED housing reflector is omitted, the cost is reduced, a process for assembling the LED housing reflector can be also omitted, obtaining the effects that the processing time can be reduced, a defective rate can be reduced, a production yield can be improved, and the workability can be improved.

The foregoing and other objects, features, aspects and advantages of the present invention will become more apparent from the following detailed description of the present invention when taken in conjunction with the accompanying drawings.

DETAILED DESCRIPTION OF THE INVENTION

A liquid crystal display (LCD) device according to an exemplary embodiment of the present invention will now be described in detail with reference to the accompanying drawings.

Figure 1:
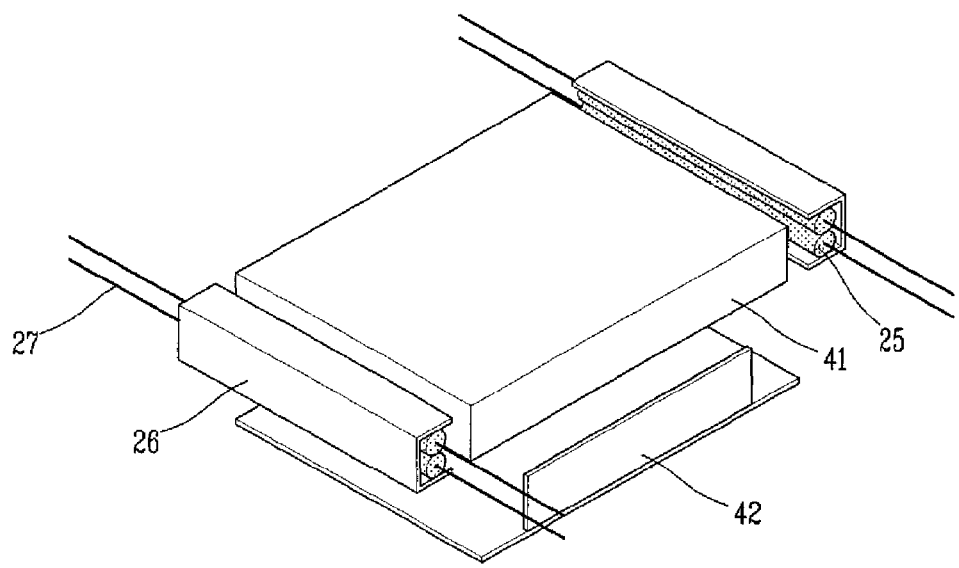
FIG. 1 is a perspective view schematically showing a general side type backlight.
Figure 2:
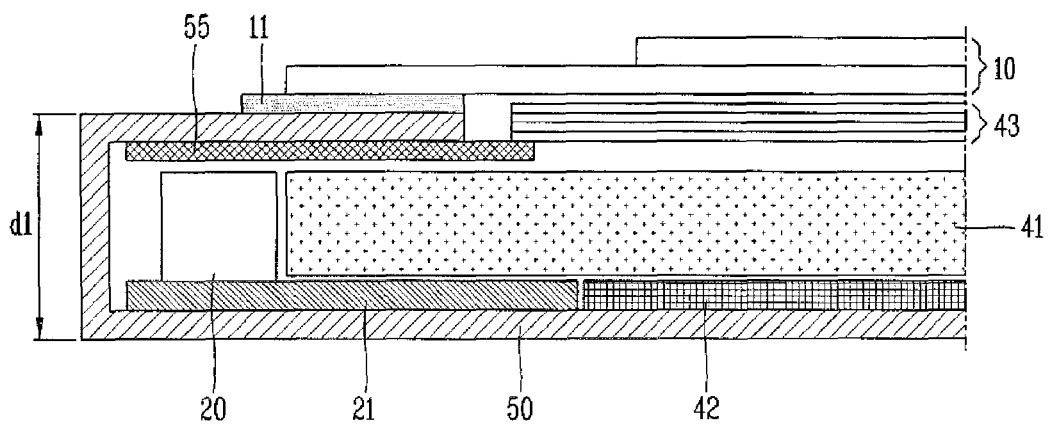
FIG. 2 is a sectional view schematically showing the structure of a general LCD device using LED emission lamps.
Figure 3:
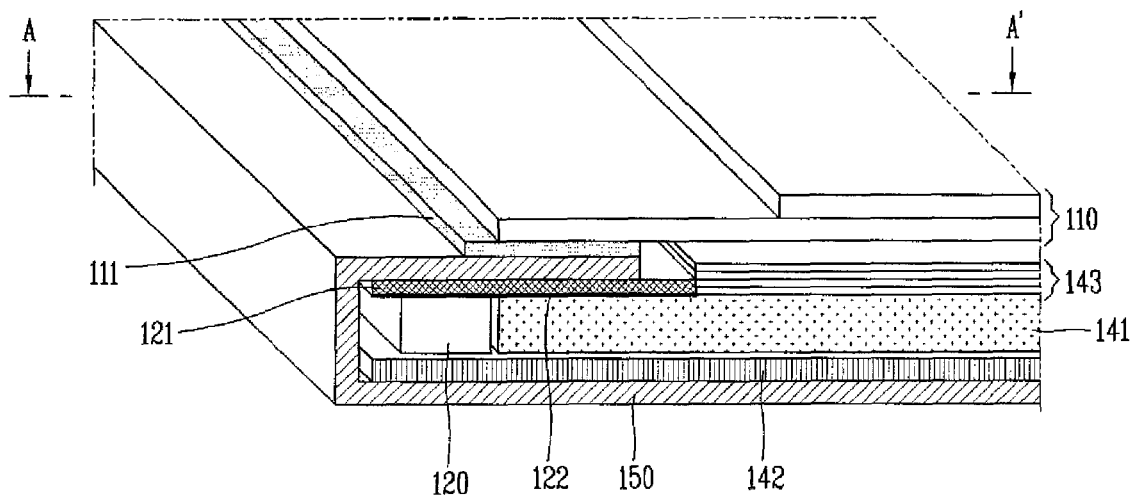
FIG. 3 is a perspective view schematically showing the structure of an LCD using LED emission lamps according to an exemplary embodiment of the present invention.
Figure 4:
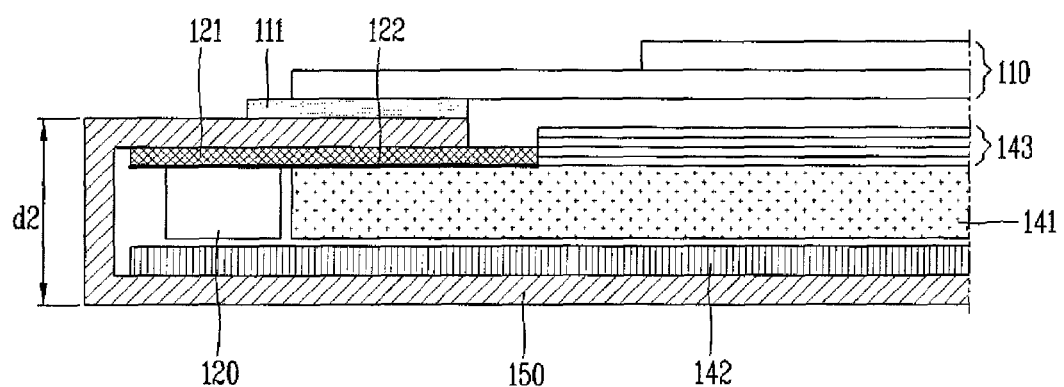
FIG. 4 is a sectional view taken along line A-A' of the LCD illustrated in FIG. 3.

FIG. 3 is a perspective view schematically showing the structure of an LCD using LED emission lamps according to an exemplary embodiment of the present invention, and FIG. 4 is a sectional view taken along line A-A' of the LCD illustrated in FIG. 3.

As illustrated, in the LCD device according to an exemplary embodiment of the present invention, an LED array 120 for generating light and a reflection plate 142 are installed on a lower cover 150, and an LED PCB 121 on which a certain driving circuit for driving the LED is mounted is attached to an upper portion of the lower cover 150 above the LED array 120.

A light guide plate 141 is installed in a direction in which the LED array 120 outputs light, and a plurality of LEDs (not shown) constituting the LED array 120 may be positioned at a certain interval between the LEDs to obtain an overall luminance uniformity of a backlight.

For example, the plurality of LEDs may be installed to be connected on the LED PCB 121. In the drawings, the LED array 120 is installed at one side of the light guide plate 141, but the present invention is not limited thereto and the LED array 120 may be installed at both sides of the light guide plate 141.

The reflection plate 142 according to an exemplary embodiment is formed to extend to the LED array 120 such that it sufficiently covers the lower portion of the LED array 120, whereby the reflection plate 142 can reflect light outputted from the LED array 120 toward the lower portion of the lower cover 150 to its maximum level and transmits the light to optical sheets 143.

Also, the LED PCB 121 attached to the upper portion of the lower cover 150 above the LED array 120 according to an exemplary embodiment of the present invention includes a certain reflection layer 122 formed on the side facing the light guide plate 141 in order to replace the existing LED housing reflector, and reflects light outputted from the LED array 120 toward the upper portion of the lower cover 150 to transmit it toward the optical sheets 143. In this case, even when a thickness d2 of the LCD device is reduced to meet the demand for making the display thinner, because the process for assembling the existing LED housing reflector is omitted, the processing time can be reduced, a defective rate can be reduced, a production yield can be improved, and workability can be improved.

In this manner, the LED PCB 121 plays the role of the existing LED housing reflector that reflects light proceeding to the upper portion of the lower cover 150 toward a light receiving portion of the light guide plate 141. In this case, a light efficiency improvement material such as white photo solder resists (PSR), polyimide (PI), or the like, is coated on the LED PCB 121, thus reflecting light outputted from the LED array 120 to the light receiving portion of the light guide plate 141.

Also, as described above, the existing reflection plate extends to the LED array 120 between the LED array 120 and the lower portion of the lower cover 150 such that it sufficiently covers the lower portion of the LED array 120, thus reflecting light outputted to the lower side from the LED array 120, to the light receiving portion of the light guide plate 141.

In this case, the LED PCB 121 is elastic so to be maintained to be flat, and the lower cover 150 may be configured such that its upper portion becomes narrower toward the lower portion at a position at which the LED array 120 is inserted.

The liquid crystal panel 110 composed of a TFT array substrate and a color filter substrate is mounted on an upper portion of the LED backlight thusly configured and is coupled with an adhesive tape 111 through an upper case (not shown) to form the LCD.

Although not shown in detail, a plurality of gate lines and a plurality of data lines are arranged vertically and horizontally to define a plurality of pixels on the TFT array substrate, and each pixel include a TFT so as to be driven as a scan signal is applied from an external source along the gate line. Also, each pixel includes a pixel electrode, and as the TFT of each pixel is driven, an image signal is inputted from an external source along the data line.

Also, the color filter substrate includes a black matrix for blocking light transmission to a non-image display area and a color filter layer implementing actual color, and a liquid crystal layer is formed between the TFT array substrate and the color filter substrate.

As so far described, in the LCD device according to an exemplary embodiment of the present invention, because the LED PCB with the reflection layer formed on surface thereof is installed at an upper side of the LED array and the reflection plate extends such that it sufficiently covers the lower portion of the LED array to thus make light emitted from the light source incident to its maximum level, thus making the LCD device thinner, and accordingly, coping with the reduction in the quantity of light. For example, in the case of the LCD device according to an exemplary embodiment of the present invention, the problem as in the related art in which the reflection plate extends to overlap is basically avoided, so the reflection efficiency of the reflection plate can be increased by 5% or greater.

In addition, because the LED housing reflector is omitted, the cost is reduced, a process for assembling the LED housing reflector can be also omitted, obtaining the effects that the processing time can be reduced, a defective rate can be reduced, a production yield can be improved, and the workability can be improved.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display (LCD) device, comprising:
   a liquid crystal panel;
   an LED flight emitting diode) array configured to supply light to the liquid crystal panel;
   a light guide plate installed in a direction in which the LED outputs light, and configured to guide light;
   a lower cover comprising:
      a lower portion;
      a side portion extending from the lower portion; and
      an upper potion opposing to the lower portion; and extending from the side portion,
      wherein the lower portion, the side portion, and the upper portion of the lower cover are made of a same material and are integral, and
      wherein the liquid crystal panel is disposed over and coupled to the upper portion of the lower cover by an adhesive tape disposed over the upper portion of the lower cover;
   a reflection plate formed between a lower side of the LED array and the lower portion of the lower cover, the reflection plate being attached to the lower portion of the lower cover; and
   an LED PCB formed between an upper side of the LED array and the upper portion of the lower cover, the LED PCB being attached to the upper side of the LED array and comprising a reflection layer coated on a surface thereof and formed at a side facing the light guide plate,
   wherein the reflection layer reflects light upwardly outputted from the LED array to the light guide plate,
   wherein the LED PCB is directly attached to an underside of the upper portion of the lower cover, and
   wherein the LED array and light guide plate are attached to the LED PCB such that there is a gap between the LED array and the reflection plate and between the entirety of the light guide plate and the reflection plate.

2. The device of claim 1, wherein the reflection plate is configured to reflect light downwardly outputted from the LED array to the light guide plate.

3. The device of claim 1, wherein the reflection plate is formed to extend toward the light guide plate to cover a the light guide plate.

4. The device of claim 1, wherein the reflection layer comprises a light efficiency improvement material of white photo solder resists (PSR) or polyimide.

5. The device of claim 1, wherein the LED PCB has elasticity to be maintained to be flat.

6. A method for fabricating a liquid crystal display (LCD) device, the method comprising:
   providing a liquid crystal panel;
   providing an LED (light emitting diode) array for generating light to the liquid crystal panel;
   providing a lower cover comprising:

a lower portion;
a side portion extending from the lower portion; and
an upper potion opposing to the lower portion and extending from the side portion,
wherein the lower portion, the side portion, and the upper portion of the lower cover are made of a same material and are integral, and
wherein the liquid crystal panel is disposed over and coupled to the upper portion of the lower cover by an adhesive tape disposed over the upper portion of the lower cover;
providing a reflection plate between a lower side of the LED array and the lower portion of the lower cover, the reflection plate being attached to the lower portion of the lower cover;
providing a light guide plate in a direction in which the LED array outputs light; and
providing an LED PCB between an upper side of the LED array and the upper portion of the lower cover, the LED PCB being attached to an upper portion of the lower cover at an the upper side of the LED array and comprising a reflection layer coated on a surface thereof and formed at a side facing the light guide plate,
wherein the reflection layer reflects light upwardly outputted from the LED array to the light guide plat,
wherein the LED PCB is directly attached to an underside of the upper portion of the lower cover, and
wherein the LED array and light guide plate are attached to the LED PCB such that a gap is formed between the LED array and the reflection plate and between the entirety of the light guide plate and the reflection plate.

7. The method of claim 6, wherein the reflection plate is formed to extend to the light guide plate such that it covers the light guide plate.

8. The method of claim 6, wherein the reflection plate reflects light downwardly outputted from the LED array to the light guide plate.

9. The method of claim 6, wherein the reflection layer comprises a light efficiency improvement material of white photo solder resists (PSR) or polyimide.

10. The method of claim 6, wherein the LED PCB has elasticity to be maintained to be flat.

* * * * *